G. G. & E. L. HOWE & R. J. TEETOR.
TRUCK.
APPLICATION FILED JAN. 25, 1917.
1,234,668.
Patented July 24, 1917.
2 SHEETS—SHEET 1.
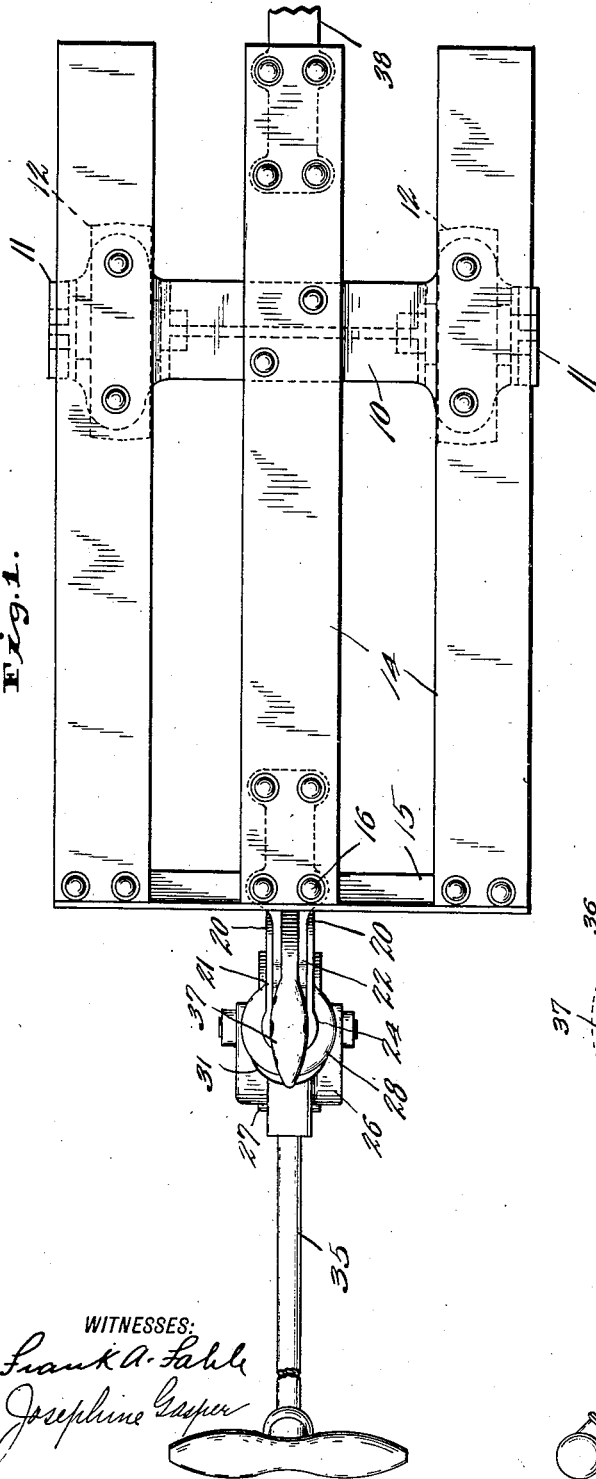
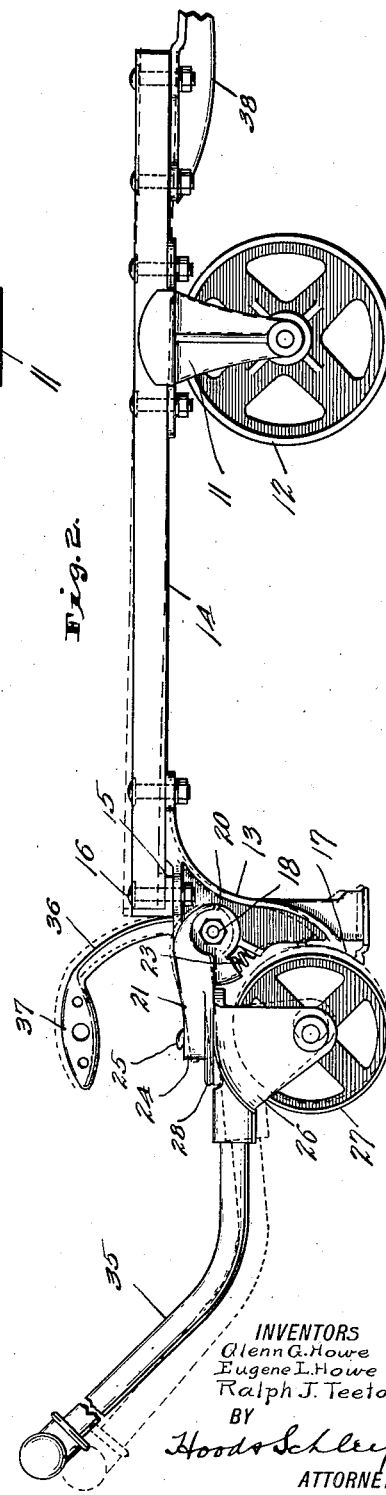
WITNESSES:
Frank A. Fable
Josephine Gasper
INVENTORS
Glenn G. Howe
Eugene L. Howe
Ralph J. Teetor,
BY
Hood & Schley
ATTORNEYS

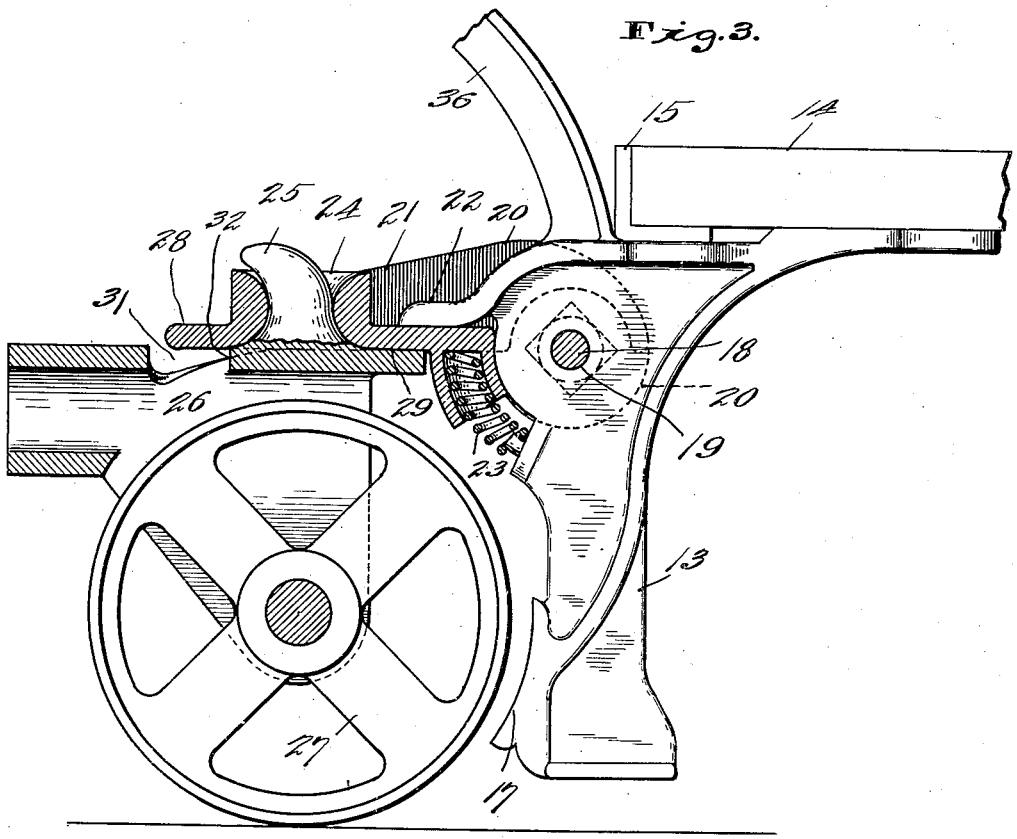

UNITED STATES PATENT OFFICE.

GLENN G. HOWE, EUGENE L. HOWE, AND RALPH J. TEETOR, OF MUSKEGON, MICHIGAN.

TRUCK.

1,234,668.   Specification of Letters Patent.   Patented July 24, 1917.

Application filed January 25, 1917. Serial No. 144,377.

*To all whom it may concern:*

Be it known that we, GLENN G. HOWE, EUGENE L. HOWE, and RALPH J. TEETOR, citizens of the United States, residing at Muskegon, in the county of Muskegon and State of Michigan, have invented a new and useful Truck, of which the following is a specification.

The object of our invention is to produce a truck having a readily separable guide wheel and handle, forming a jack truck, and a main body having a jack-truck-receiving bracket, of such form that, by proper manipulation of the jack truck, a desired braking under heavy loads may be obtained.

A further object of our invention is to so form the parts that a series of the load-carrying trucks may be connected in a train with a single jack truck at the forward end, the said jack truck, however, being used in connection with any one of the load-carrying trucks.

The accompanying drawings illustrate our invention. Figure 1 is a plan; Fig. 2 a side elevation; Fig. 3 a side elevation, in partial vertical section, of the jack truck and the jack-truck-receiving member of the load-carrying truck; Fig. 4 a plan of the parts shown in Fig. 3; Fig. 5 a side elevation of a series of trucks arranged in a train.

In the drawings, 10 indicates a rear truck casting, provided at each end with a pair of depending arms 11, between which is journaled a supporting wheel 12. A single supporting leg 13 is provided for the front end of the load-carrying truck, the load-carrying portion being formed by a platform, or bars, 14, secured to the rear truck 10, to the front leg 13, and to a transversely arranged angle iron 15, which is attached to the leg 13 by bolts 16 which also pass through the load-carrying platform 14. At its forward lower corner, leg 13 is provided with a braking face 17 and near its upper forward corner it is perforated at 19 and is formed to be embraced by the rearwardly projecting ears 20 of an eye-carrying arm 21, a pivot bolt 18 passing through ears 20 and perforation 19. Leg 13 is provided with a forwardly projecting finger 22 which engages arm 21 and limits its forward swinging movement, the parts being normally held in the position shown in Fig. 3 by a spring 23. Arm 21 is provided at its forward end with an eye 24 which is adapted to receive a hook-shaped pin 25 carried by the jack truck frame 26, said frame having journaled therein a single wheel 27. For the sake of lateral stability of the forward end of the load-carrying truck, the eye 24 is surrounded by a horizontal flange 28 of considerable diameter, said flange normally resting squarely upon the flat upper face 29 of the jack truck frame. In order that the desired stability may be obtained when the jack truck is turned at a considerable angle to the medial line of the load-carrying truck, it is necessary that the flange 28 extend forwardly of the eye 24, as well as at each side and in order to hold the load-carrying truck against tipping, when the jack truck is being withdrawn, we provide the jack truck bracket, forward of pin 25, with a depression, or opening, 31 which terminates at its rear in a shoulder 32 of considerable lateral extent, as shown in dotted lines in Fig. 4. It will be noted that when the parts are in the position shown in Fig. 3, the lower end of leg 13 is raised from the floor and the rear of wheel 27 lies some distance from the braking face 17. When the jack truck is to be withdrawn, the load-carrying truck is lowered slightly at its forward end in order that the load-carrying platform may come to rest with the leg 13 resting upon the floor. During this movement, flange 28 will rest quite squarely upon shoulder 32 and all tendency of the truck to tip laterally, due to any unbalancing load at the forward end of the load-carrying truck, will be prevented.

Under normal conditions, the arm 21 is held tightly up against finger 22, both by reason of spring 23 and by reason of any load carried upon the platform 14. When a braking action is desired, the operator has merely to press downwardly upon handle 35, as indicated by dotted lines in Fig. 2, this movement swings arm 21 about bolt 18, thus raising the front end of the platform 14 slightly and permitting wheel 27 to swing back against the braking face 17. As soon as the downward pressure upon handle 35 is released, the parts resume their normal position, with wheel 27 free from the braking face 17. It will thus be seen that the weight of handle 35 cannot cause any braking action nor can any carelessness in ordinary handling of the handle result in such braking action. Only a direct and intentional downward pressure upon the handle 35, sufficient to actually lift the forward end of the platform 14 and the load carried thereby, will result in the desired braking action.

In order to facilitate the handling of the load-carrying truck, without the use of the jack truck, we provide leg 13 with an upwardly and forwardly extending arm 36 which is provided at its end with a handle 37. Each of the platforms 14 is provided at its rear with a bracket 38 provided with an upwardly extending pin 39 adapted to receive any one of the eyes 24, so that several of the load-carrying trucks may be connected into a train, as shown in Fig. 5.

It will also be noted that by providing the opening 31 in the jack truck, the wide flange 28 does not interfere with the jack truck in front of the pin 25 during the operation of inserting the pin 25 into the opening 24. If it were not for the opening 31, or the clear space in front of the shoulder 32, pin 25 could not be forwardly curved to the extent shown in the drawings. This forward curving of pin 25 in conjunction with the close association of the under surface of arm 21 and the top surface of the jack truck frame, contributes materially to the stability of the connection between the jack truck and load-carrying truck.

We claim as our invention:

1. A load-carrying truck comprising a main body, a wheeled support at one end, a downwardly-extending leg at the other end having a braking surface at its forward face, and a jack-truck-receiving-arm hinged relative to said leg and extended forwardly therefrom.

2. A load-carrying truck comprising a main body, a wheeled support at one end, a downwardly-extending leg at the other end having a braking surface at its forward face, a jack-truck-receiving-arm hinged relative to said leg and extended forwardly therefrom, and a spring normally urging said hinged arm to its upward limit.

3. The combination of a load-carrying platform, wheeled supports at one end, a medial leg at the other end, a forwardly extending jack-truck-receiving-arm hinged relative to said leg, and a jack truck provided with a member for separable swiveled connection with said jack-truck-receiving-arm.

4. The combination of a load-carrying platform, wheeled supports at one end, a medial leg at the other end, a forwardly extending jack-truck-receiving-arm hinged relative to said leg, and a jack truck provided with a member for separable swiveled connection with said jack-truck-receiving-arm, said jack truck and jack-truck-receiving-arm having laterally extended mating horizontal surfaces and the jack truck having, forward of the swiveled connection, a laterally extended shoulder for the reception and support of the jack-truck-receiving-arm when the jack truck is being withdrawn.

5. The combination of a load-carrying platform, wheeled supports at one end, a medial leg at the other end provided with a forwardly extending jack-truck-receiving-arm, and a jack truck provided with a member for separable swiveled connection with said receiving arm, said jack-truck-receiving-arm having an extended horizontal surface and the jack truck having a laterally extended shoulder arranged to receive and support the laterally extended surface of the arms as the jack truck is being withdrawn.

In witness whereof, we have hereunto set our hands at Muskegon, Michigan, this ninth day of January, A. D. one thousand nine hundred and seventeen.

GLENN G. HOWE.
EUGENE L. HOWE.
RALPH J. TEETOR.